United States Patent
Balducci et al.

[11] Patent Number: 6,121,429
[45] Date of Patent: Sep. 19, 2000

[54] CATALYTIC COMPLEXES BASED ON LANTHANIDES FOR THE (CO) POLYMERIZATION OF CONJUGATED DIENES

[75] Inventors: Alessandro Balducci, Ravenna; Lido Porri; Nikolai Choubine, both of Milan, all of Italy

[73] Assignee: Enichem S.p.A., S. Donato Mil.se, Italy

[21] Appl. No.: 09/192,323

[22] Filed: Nov. 16, 1998

[30] Foreign Application Priority Data

Nov. 27, 1997 [IT] Italy .................. MI97A2628

[51] Int. Cl.$^7$ .................. C07F 5/00; C08F 4/06
[52] U.S. Cl. .................. 534/15; 556/1; 526/131; 526/164; 526/173; 526/335
[58] Field of Search .................. 556/1; 534/15; 526/131, 164, 173, 335

[56] References Cited

U.S. PATENT DOCUMENTS 4,801,666  1/1989  Marks et al. ............... 526/123

OTHER PUBLICATIONS

R. Taube, et al., Journal of Organometallic Chemistry, vol. 1, No. 513, pp. 37–47, "XLVII. Darstellung und Charakterisierung Eininger Anionischer Allylneodym(III)–Komplexe Als Katalysatoren Fur Die Stereospezifische Butadienopolymerisation: Li[Nd($\eta^3$–C$_3$H$_5$)$_4$] • 1,5Dioxan, Li[Nd($\pi$–C$_5$H$_5$ )($\eta$–C$_3$H$_5$)$_3$] • 2Dioxan Und Li[Nd($\eta^5$–C$_5$Me$_5$)($\eta^3$–C$_3$H$_5$)$_3$] • 3Dimethylglykolether", May 3, 1996.

*Primary Examiner*—Porfirio Nazario-Gonzalez
*Attorney, Agent, or Firm*—Oblon, Spivak, McClelland, Maier & Neustadt, P.C.

[57] ABSTRACT

Complexes of lanthanides are described, which are effective in the polymerization of conjugated dienes, obtained by reacting $LnX_3$ with at least one Lithium compound selected from:

(i) Li(A), the molar ratio Li(A)/$LnX_3$ being from 1.5 to 2.5;
(ii) LiLn(A)$_4$, the molar ratio between LiLn(A)$_4$ and $LnX_3$ being from 0.5 to 1.5;
wherein Ln is selected from any of the Lanthanides; X is selected from halides, carboxylates, alcoholates, —N(R$_x$) (R$_y$) wherein R$_x$ and R$_y$, the same or different, are C$_1$–C$_5$ alkyl radicals;
A is an allyl radical having the general formula

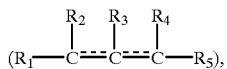

wherein R$_1$, R$_2$, R$_3$, R$_4$ and R$_5$, the same or different, are selected from hydrogen and C$_1$–C$_{10}$ alkyl radicals.

11 Claims, No Drawings

CATALYTIC COMPLEXES BASED ON LANTHANIDES FOR THE (CO) POLYMERIZATION OF CONJUGATED DIENES

The present invention relates to catalytic complexes based on Lanthanides, their preparation and use in the (co)polymerization of conjugated dienes.

Catalytic systems based on lanthanides, particularly neodymium, are known in literature, for the polymerization of conjugated diolefins to give polydiolefins with a high content of cis (>96%).

In most cases, the above catalytic systems are three-component systems, of which the first component consists of a lanthanide compound (carboxylate, alcoholate); a second component consists of an organometallic compound of magnesium or aluminum; the third component consists of a chlorine donor.

Interesting examples of three-component catalytic systems, having a high activity and easy industrial preparation, are cited in EP-A-201.962, EP-A-201.979 and EP-A-207.559, in which t-butylchloride is used as halogenating agent.

In the known art, binary catalytic systems are also described, obtained from the combination of lanthanide salts (for example $NdCl_3.3D$ wherein D is an electron donor, for example alcohol, ether, amine) with aluminum trialkyl, for example triisobutylaluminum.

Examples of the above binary catalytic systems are cited in U.S. Pat. No. 4,575,538, JP-A-8361107 and JP-A-84113003.

Catalysts which are much more active than the previous ones with respect to the polymerization of diolefins to give 1,4-cis polymers, have been obtained using as neodymium compound, an allyl derivative of this element.

Recent scientific publications describe various catalytic systems consisting of the combination of a derivative of neodymium or praseodymium with compounds of aluminum comprising $AlR_3$, $AlR_2Cl$, MAO. $Nd(allyl)_3$, $Nd(allyl)_2Cl$, $CpNd(allyl)_2$, $LiNd(allyl)_4$ were used as allyl compounds of neodymium (see for example R. Taube et al., Macromol. Symp. 89, 193, 1995; J. Organomet. Chem. 513, 37,1996).

According to these works, the most active catalyst proves to be that obtained from MAO and $Nd(allyl)_2Cl$.

These works also describe a method for the synthesis of $Nd(allyl)_2Cl$ which is obtained by reaction between neodymium triallyl and neodymium trichloride.

$Nd(allyl)_3$ is in turn obtained by reaction between $LiNd(allyl)_4$ and $B(C_2H_5)_3$ in dioxane.

As a result the Neodymium compound $Nd(allyl)_2Cl$ proves to be difficult to prepare; this greatly limits interest in its use as a possible industrial catalyst.

The necessity has therefore been felt for complexes of Neodymium having at least the same catalytic activity as $Nd(allyl)_2Cl$, but obtained with simple processes.

It has now been found that particular complexes of Lanthanides, particularly neodymium, which are just as efficient as $Nd(allyl)_2Cl$, can be prepared according to a much simpler process.

In accordance with this, the present invention relates to complexes of Lanthanides effective in the polymerization of conjugated dienes, obtained by reacting $LnX_3$ with at least one Lithium compound selected from:

(i) Li(A), the molar ratio $Li(A)/LnX_3$ being from 1.5 to 2.5, preferably from 1.8 to 2.2, even more preferably 2/1;

(ii) $LiLn(A)_4$, the molar ratio between $LiLn(A)_4$ and $LnX_3$ being from 0.5 to 1.5, preferably from 0.8 to 1.2, even more preferably 1/1;

wherein Ln is selected from any of the Lanthanides, and is preferably neodymium;

X is selected from halides, carboxylates, alcoholates, $-N(R_x)(R_y)$ wherein $R_x$ and $R_y$, the same or different, are $C_1$–$C_5$ alkyl radicals, X is preferably selected from halides and is even more preferably Cl;

A is an allyl radical having the general formula

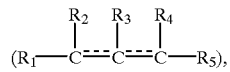

wherein $R_1$, $R_2$, $R_3$, $R_4$ and $R_5$, the same or different, are selected from hydrogen and $C_1$–$C_{10}$ alkyl radicals, preferably from H and $C_1$–$C_4$ alkyl radicals, and A is preferably selected from allyl, neopentylallyl, neopentylmethallyl.

In the case of allyl, $R_1=R_2=R_3=R_4=R_5=H$; in the case of neopentylallyl, $R_1=R_2=R_3=R_4=H$, $R_5=CH_2-C(CH_3)_3$; in the case of neopentylmethallyl, $R_1=H$, $R_2=CH_3$, $R_3=H$, $R_4=H$, $R_5=CH_2-C(CH_3)_3$.

There is reason to believe, but there is no experimental evidence to confirm this, that in both cases the reaction product prevalently consists of $Ln(A)_2X$, possibly complexed with LiX.

The Lithium allyl is preferably prepared in situ, for example by reaction between Li butyl and Tin tetra-allyl.

As far as Lithium neopentylallyl and lithium neopentylmethallyl are concerned, these can be obtained by reaction between a Lithium alkyl, for example Lithium ter-butyl and butadiene and isoprene respectively (see J. Organomet. Chem. 1972, 44, pages 39–56).

Lithium neopentylallyl and Lithium neopentylmethallyl are preferable to Lithium allyl. In fact they are easier to prepare and give (for example by reaction with $NdCl_3$) more soluble products which consequently react more easily with the cocatalyst.

The Lanthanide complex of the present invention can be obtained by simple mixing of the reagents, preferably at temperatures ranging from +20° C. to −90° C., even more preferably from −15° C. to −50° C. It is preferable to use solutions of the above reagents in the presence of solvents, such as THF and aliphatic ethers, alone or mixed with hydrocarbon solvents.

When solvents are used, the Lanthanide complex is dissolved or dispersed in the above solvents.

The Lanthanide complex thus obtained can be separated from the solvent and used directly in the polymerization phase, or again diluted and/or dispersed in a suitable solvent/diluent, preferably an aromatic solvent, even more preferably toluene.

A further object of the present invention relates to a process for the homo and copolymerization of $C_4$–$C_{20}$ conjugated dienes, particularly 1,3-butadiene and isoprene, characterized in that the polymerization is carried out in the presence of a catalytic system comprising the product obtained by reacting $LnX_3$ with at least one Lithium compound selected from:

(i) Li(A), the molar ratio $Li(A)/LnX_3$ being from 1.5 to 2.5, preferably from 1.8 to 2.2, even more preferably 2/1;

(ii) $LiLn(A)_4$, the molar ratio between $LiLn(A)_4$ and $LnX_3$ being from 0.5 to 1.5, preferably from 0.8 to 1.2, even more preferably 1/1;

wherein Ln is selected from any of the Lanthanides, and is preferably neodymium;

X is selected from halides, carboxylates, alcoholates, —N(R$_x$) (R$_y$) wherein R$_x$ and R$_y$, the same or different, are C$_1$–C$_5$ alkyl radicals, X is preferably selected from halides and is even more preferably Cl;

A is an allyl radical having the general formula

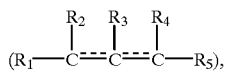

wherein R$_1$, R$_2$, R$_3$, R$_4$ and R$_5$, the same or different, are selected from hydrogen and C$_1$–C$_{10}$ alkyl radicals, preferably from H and C$_1$–C$_4$ alkyl radicals, and A is preferably selected from allyl, neopentylallyl, neopentylmethallyl.

Typical examples of conjugated dienes which can be used in the (co)polymerization of the present invention are, in addition to 1,3-butadiene and isoprene, piperylene, 1,3-hexadiene, 2-methyl-1,3-pentadiene, 3-methyl-1,3-pentadiene.

As well as the conjugated diene, smaller quantities of C$_2$–C$_5$ olefins can also be present.

The polydienes which can be obtained with the process of the present invention are characterized by a content of cis >90%, usually >96%.

In the (co)polymerization of conjugated dienes, the catalytic system also comprises, in addition to the Lanthanide complex, another component (which we will call cocatalyst) selected from (a) Aluminum alkyls having the general formula AlX$_s$R$_{3-s}$ wherein s is zero or an integer from 1 to 2, (b) aluminoxanes and (c) compounds having the general formula (I) (Ra)$_x$NH$_{4-x}$B(Rd)$_4$, or (II) (Ra)$_3$PHB(Rd)$_4$, or (III) B(Rd)$_3$, which by reaction with the Lanthanide complex are capable of generating catalytic systems of an ionic nature. In the above compounds having general formula (I), (II) or (III), the Ra groups, the same or different, are monofunctional alkyl or aryl radicals, whereas Rd, the same or different, are monofunctional aryl radicals, preferably partially or totally fluorinated, even more preferably totally fluorinated. The molar ratio between the compound having general formula (I), (II) or (III) and the Lanthanide complex can vary from 0.1 to 10, preferably from 0.5 to 3, even more preferably from 0.7 to 2.

With respect to aluminoxanes, these are compounds of aluminum having general formula (IV)

$$(R^e)_2-Al-O-[-Al(R^e)-O-]_p-Al(R^e)_2 \quad (IV),$$

wherein the various $R^e$, the same or different, are selected from C$_1$–C$_6$ alkyl radicals, C$_6$–C$_{18}$ aryl radicals or H, "p" is zero or an integer from 2 to 50, preferably from 10 to 35. The various R$^3$ are preferably the same and are selected from methyl, isobutyl, phenyl or benzyl, preferably methyl (MAO=Methyl alumino-oxane).

If the various R$^3$ are different, they are preferably methyl and hydrogen or alternatively methyl and isobutyl, the hydrogen or isobutyl preferably being present, as a number of R$^3$ radicals, in 0.01 to 40% by weight.

The aluminoxanes can be prepared according to various methods known to experts in the field. One of the methods comprises, for example, the reaction of an aluminum-hydrocarbyl and/or aluminum-hydridoaluminum compound with water (gaseous, solid, liquid or bound, for example crystallization water) in an inert solvent, for example toluene. For the preparation of an aluminoxane having different $R^e$ alkyl groups, two different aluminumtrialkyls (AlR$_3$+ AlR'$_3$) are reacted with water (see S. Pasynkiewicz, Polyhedron 9 (1990) 429–430 and EP-A-302 424).

The exact structure of the aluminoxane is not known.

The catalytic system of the present invention (Lanthanide complex and cocatalyst) can be prepared by putting the catalyst and cocatalyst in contact with each other, in the presence of or without the monomer to be polymerized, inside or outside the reactor.

The quantities of catalyst and cocatalyst are not particularly limited. For example, in the case of polymerization in a solvent, the quantity of catalyst is preferably within the range of 10$^{-7}$ to 10$^2$ mmoles/liter, even more preferably 10$^{-4}$ to 1 mmole/liter, in terms of Lanthanide. When AlX$_s$R$_{3-s}$ or aluminoxanes (particularly MAO) are used as cocatalyst, the molar ratio between the Aluminum and Lanthanide is preferably greater than 10 and less than 10,000.

The catalyst and cocatalyst can be introduced separately into the reaction reactor or after previous contact with each other. In the latter case the contact can be carried out in the presence of a monomer which is then to be polymerized, effecting a so-called "preliminary polymerization".

The polymerization can be carried out in solution using an aliphatic, cycloaliphatic or aromatic inert hydrocarbon solvent. For obvious economic reasons, an aliphatic hydrocarbon is preferred, preferably hexane.

The polymerization can also be carried out using, as solvent, the same diolefin to be polymerized, according to the so-called "bulk process".

The temperature range of the polymerization is from −70° C. to +100° C., preferably from −20° C. to +80° C. As far as the pressure is concerned, this is preferably the pressure of the components of the mixture to be polymerized.

The following examples provide a better understanding of the present invention.

EXAMPLES

Examples 1 to 3 illustrate the preparation of compounds of neodymium starting from Li(allyl) reacted with NdCl$_3$.

The Lithium allyl used in example 1 was prepared starting from Lithium butyl and Tin tetra-allyl according to the scheme (I)

$$xLiBu + Sn(all)_4 \rightarrow xLi(all) + Sn(all)_{4-x}Bu_x \quad (I)$$

The Lithium neopentylallyl used in example 3, was prepared in a hydrocarbon solution starting from butadiene and Lithium ter-butyl according to what is described in J. Organomet. Chem. 1972, 44, pages 39–56.

The Lithium neopentylmethallyl used in example 2, is prepared by adding 0.75 ml of isoprene to 90 ml of a hexane solution containing 6 mmoles of Lithium ter-butyl at −40° C. and slowly bringing the mixture to about 20° C. under stirring for 2 hours, using the same procedure described in J. Organomet. Chem. 1972, 44, pages 39–56.

Example 1

0.615 g of NdCl$_3$ .2THF (1.56 mmoles), 17 ml of THF and 0.3 ml of tin tetra-allyl (1.25 mmoles) are introduced into a 50 ml Schlenk tube. 1.56 ml of a 2.0 M solution of Lithium butyl in cyclohexane are added to the suspension stirred and cooled to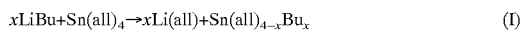−40° C. The mixture is left under stirring for 2 hours at a temperature ranging from −40° C. to −20° C., then for 2 hours at about 20° C.; a dark green solution is formed.

3 ml of the solution thus obtained are removed; the solvent is eliminated by evaporation under vacuum at about 20° C. obtaining a dark green-coloured solid.

20 ml of toluene are added to the residue thus obtained, the mixture is cooled to −30° C. and 5 ml of a toluene solution of MAO at 10% are then introduced and left under stirring for 60 minutes at −30° C. A greenish-red suspension is obtained which is conserved at −20° C. and is stirred before use. The final concentration of Neodymium is $10^{-5}$ moles/l.

1 ml of the above suspension is added to 50 ml of a solution containing 3 grams of butadiene in hexane. The polymerization is carried out at about 20° C. for 10 minutes. At the end the catalyst is deactivated with ethanol and 0.2 phr. of Irganox 565® and 0.1 phr of trinonyl phenyl phosphite (TNPP) are added.

The polymer is recovered by precipitation in ethanol and dried in a vacuum oven at 55° C. for 2 days.

2.7 grams of polybutadiene are obtained, having the following characteristics:

Mw=735,000; Mw/Mn=1.8; % 1,4-cis=96.8.

Example 2

1.11 grams of $NdCl_3.2THF$ (2.8 mmoles) in 18 ml of THF are suspended in a 50 ml Schlenk tube. 10 ml of a hexane solution containing 6 mmoles of Lithium neopentylmethallyl are added at −35° C. The mixture is left under stirring for 60 minutes at −35° C.–40° C., and at the end a dark green solution is obtained.

5 ml of the solution thus obtained are then removed and the solvent is evaporated under vacuum at −10° C., obtaining a rubbery green-coloured residue. The residue is extracted with 40 ml of toluene at −50° C., producing a light green solution, unstable at room temperature, and a white precipitate which is removed by decanting.

20 ml of the above solution are joined, at a temperature of −35° C., to 5 ml of a toluene solution of MAO at 10%. A greenish-red suspension is obtained which is conserved at −20° C. and is stirred before use. The final concentration of Neodymium is $10^{-5}$ moles/liter.

1.0 ml of the above suspension is added to 50 ml of a solution containing 3 grams of 1,3-butadiene diluted in hexane. The polymerization is carried out at room temperature for 10 minutes. At the end the catalyst is deactivated in ethanol and 0.2 phr of Irganox 565® and 0.1 phr of TNPP are added. The polymer is recovered by precipitation in ethanol and dried in a vacuum oven at 55° C. for 2 days. 2.7 grams of polybutadiene are obtained, having the following characteristics: % 1,4-cis=96.1; Mw=463000; Mw/Mn=1.7.

Example 3

The catalyst is prepared as described in example 2, but using Lithium neopentylallyl instead of Lithium neopentylmethallyl. The final concentration of neodymium is $10^{-5}$ moles/liter.

1.2 ml of the suspension thus prepared are added to 50 ml of a solution containing 3 grams of 1,3-butadiene in hexane. The polymerization is carried out at about 20° C. for 10 minutes. At the end, the catalyst is deactivated with ethanol and 0.2 phr of Irganox 565® and 0.1 phr of TNPP are added.

The polymer is recovered by precipitation in ethanol and dried in a vacuum oven at 55° C. for 2 days.

1.9 grams of polybutadiene are obtained, having the following characteristics: % 1,4-cis=95.6; Mw=268000; Mw/Mn=2.7.

Example 4

1 gram of $NdCl_3.2THF$ (2.5 mmoles) is placed in a 50 ml Schlenk tube. 15 ml of a solution of $LiNd(allyl)_4.1.5D$ (D=dioxane) in THF, at a concentration of 0.165 moles/liter, are then added at about 20° C. The mixture is left under stirring at about 20° C. for a night, with the formation of a dark green solution.

3 ml of the solution thus obtained are removed and the solvent is evaporated under vacuum at room temperature, obtaining a dark green-coloured residue.

80 ml of toluene are added to the residue thus obtained, the mixture is cooled to −30° C., 20 ml of a toluene solution of MAO at 10% are then added, and the mixture is left under stirring for 1 hour at −30° C. A greenish-red suspension is obtained which is conserved at −20° C. and is stirred before use. The final concentration of neodymium is $10^{-5}$ moles/liter.

1.0 ml of the above suspension thus prepared is added to 50 ml of a solution containing 3 grams of 1,3-butadiene in hexane. The polymerization is carried out at room temperature for 10 minutes. At the end the catalyst is deactivated with ethanol and 0.2 phr of Irganox 565® and 0.1 phr of TNPP are added. The polymer is recovered by precipitation in ethanol and dried in a vacuum oven at 55° C. for 2 days.

2.8 grams of polybutadiene are obtained, having the following characteristics: % 1,4-cis>97; Mw=922000; Mw/Mn=1.8.

What is claimed is:

1. Lanthanide complexes efficient in the polymerization of conjugated dienes, obtained by reacting $LnX_3$ with at least one Lithium compound selected from:

(i) Li(A), the molar ratio $Li(A)/LnX_3$ being from 1.5 to 2.5;

(ii) $LiLn(A)_4$, the molar ratio between $LiLn(A)_4$ and $LnX_3$ being from 0.5 to 1.5;

wherein Ln is selected from any of the Lanthanides;

X is selected from halides, carboxylates, alcoholates, $—N(R_x)(R_y)$ wherein $R_x$ and $R_y$, the same or different, are $C_1–C_5$ alkyl radicals;

A is an allyl radical having the general formula

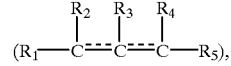

wherein $R_1$, $R_2$, $R_3$, $R_4$ and $R_5$, the same or different, are selected from hydrogen and $C_1–C_{10}$ alkyl radicals.

2. The Lanthanide complexes according to claim 1, wherein Ln is neodymium.

3. The Lanthanide complexes according to claim 1, wherein the molar ratio $Li(A)/LnX_3$ is from 1.8 to 2.2 and the molar ratio $LiLn(A)_4/LnX_3$ is from 0.8 to 1.2.

4. The Lanthanide complexes according to claim 3, wherein the molar ratio $Li(A)/LnX_3$ is 2 and the molar ratio $LiLn(A)_4/LnX_3$ is 1.

5. The Lanthanide complexes according to claim 1, wherein X is selected from halides.

6. A lanthanide complex according to claim 5, wherein X is chloride.

7. The complex according to claim 1, wherein $R_1$, $R_2$, $R_3$, $R_4$ and $R_5$, the same or different, are selected from hydrogen and $C_1–C_4$ alkyl radicals.

8. The complex according to claim 1, wherein A is selected from allyl, neopentylallyl, neopentylmethallyl.

9. A process for the homo and copolymerization of $C_4–C_{20}$ conjugated dienes, characterized in that the (co)

polymerization is carried out in the presence of a catalytic system comprising the Lanthanide complex according to claim 1.

10. The process according to claim 9, characterized in that the catalytic system comprises, in addition to the Lanthanide complex, a cocatalyst selected from (a) Aluminum alkyls having the general formula $AlX_sR_{3-s}$ wherein s is zero or an integer from 1 to 2, (b) aluminoxanes and (c) compounds having the general formula (I) $(Ra)_xNH_{4-x}B(Rd)_4$, or (II) $(Ra)_3PHB(Rd)_4$, or (III) $B(Rd)_3$.

11. The process according to claim 9, wherein the conjugated diene is selected from 1,3-butadiene and isoprene.

* * * * *